Patented May 20, 1952

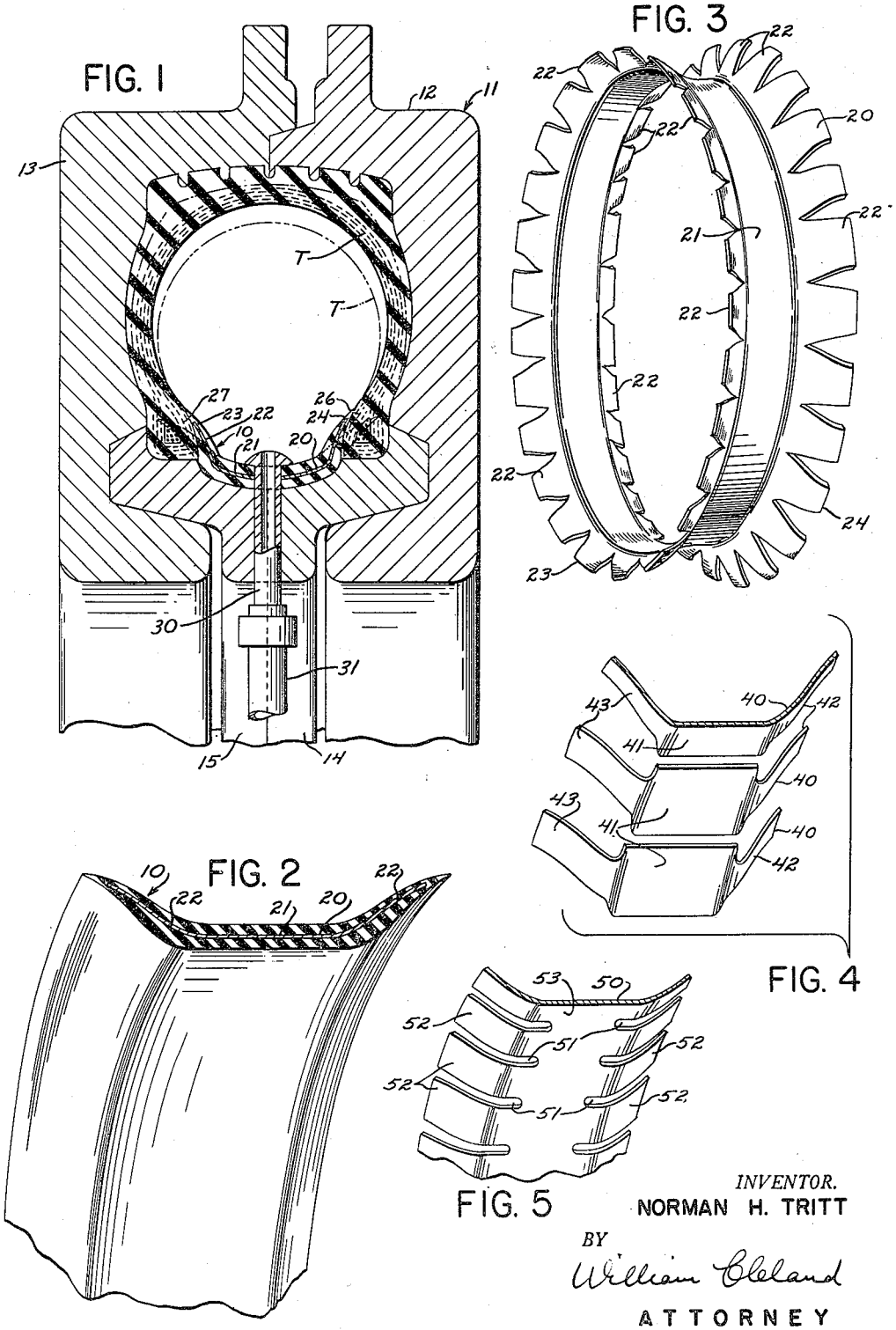

2,597,550

UNITED STATES PATENT OFFICE 2,597,550

PRESSURE SEALING DEVICE FOR VULCANIZING PNEUMATIC TIRES

Norman H. Tritt, Akron, Ohio

Application November 18, 1949, Serial No. 128,123

5 Claims. (Cl. 18—38)

1

This invention relates to tire vulcanizing molds, and, in particular, relates to a device for eliminating the use of the conventional pressure bag in vulcanization of pneumatic tires.

Heretofore, pneumatic tires have been vulcanized without the use of conventional pressure bags for applying internal pressure in the usual preformed vulcanizable casing in a vulcanizing mold. Known methods by which the pressure bags have been eliminated, however, have proven to be somewhat unsatisfactory in that the sealing devices employed have failed to effectuate a tight seal. Resulting escape of pressure fluid around the bead portions of the tire materially reduced the utility of such devices.

It is an object of the present invention to provide a device for effectively and efficiently sealing a tire against loss of internal pressure during the vulcanization process when use of the conventional pressure bag is eliminated, whereby the aforementioned difficulties are obviated.

Other objects of the invention will be manifest from the following brief description and the accompanying drawings.

Of the drawings:

Figure 1 is a cross section taken through a portion of a conventional tire mold showing the improved annular sealing device positioned within a tire casing.

Figure 2 is a perspective view, partly broken away and in section, illustrating the sealing device in normal vulcanized shape.

Figure 3 is a detail perspective view of one form of annular spring which is incorporated in the sealing device of Figure 2.

Figure 4 is a fragmentary perspective view, partially in section, illustrating a modified form of spring means adapted to be incorporated in the sealing device.

Figure 5 is a fragmentary perspective view, partially in section, of another modified form of annular spring means adapted for use in the sealing device.

Referring in particular to Figure 1 of the drawings, the numeral 10 designates an annular pressure-sealing device, embodying the features of the invention, incorporated in a preformed vulcanizable casing for a conventional pneumatic tire T, the same being shown in chain-dotted

2 lines as being enclosed within the tire-forming cavity of a sectional vulcanizing mold 11. The mold shown is of known type, including two mating sections 12 and 13, and a bull ring having annular mating parts 14 and 15.

The pressure-sealing device 10 includes an annular pressure-applying insert 20 of channel-shaped cross-section and of springy metal embedded or encased within a similarly channel-shaped body or annulus of vulcanized rubber or like resilient material. One form of insert 20 is best shown in Figure 3, the same comprising a cylindrical portion 21 and closely spaced tangs 22, 22 extending freely from oppositely disposed edges thereof and generally defining discontinuous annular flanges 23 and 24. Within the device 10 as a complete unit the tangs 22, 22 are adapted to be compressed axially inwardly against the inherent stiffening resiliency thereof for purposes to be described later, without adjacent tangs frictionally interengaging, to apply requisite uniform pressure completely around the bead portions 26 and 27 of a preformed unvulcanized tire casing, so as to provide sufficient sealing pressure between these portions for preventing the escape of pressure-fluid therethrough.

Suitably attached to the sealing device, radially inwardly from a laterally central portion thereof, is a pressure-fluid inlet and outlet stem 30 adapted to extend through an aperture in the bull ring as shown in Figure 1 and to have suitably releasably attached thereto a conduit 31 from a source (not shown) of pressure fluid such as air or steam for the application of internal pressure to the tire casing in the closed mold as shown in Figure 1.

In use or operation of the improved sealing device 10 in the manufacture of a pneumatic tire, the same is self-centeringly engaged between the opposed inner bead portions of the unvulcanized tire casing, and the tire casing with the sealing device thus positioned therein is enclosed within the mold cavity as shown in Figure 1 with the casing in chain-dotted lines. In the last-described position the opposed, radially outwardly upstanding annular flange portions of the rubber annulus, by reason of the inherent resiliency of the tangs 22 of insert 21 in addition to the resiliency of the rubber in which they are embedded, will seal tightly against said tire bead portions, the normal positions of these flange portions being shown in chain-dotted lines in Figure 1. Upon introduction of the pressure-fluid through conduit 31 and stem 30, the tendency is to further seal the resilient flanges 23, 24 of the device 10 against the tire bead portions and escape of pressure-fluid outwardly between said flanges and the tire beads is obviated. Introduction of pressure-fluid to the interior of the tire casing, while the tire casing is subjected to heat of vulcanization through the mold in known manner, is effective to cure the tire into the condition shown in full lines in Figure 1.

It will be seen from the foregoing that by use of the improved sealing device 10 an effective method of sealing the pressure-fluid within the preformed tire casing while in the vulcanizing mold is provided, wherein the use of the troublesome, uneconomical conventional air bag is obviated. Furthermore, the use of the cumbersome and expensive tire-bag removing equipment is also eliminated.

A modified form which may be substituted for the insert 20 is shown in Figure 4. In this form of the invention the insert means comprises a plurality of channel-shaped segments 40 having a base portion 41 and opposite side flanges 42 and 43, the same being adapted to be embedded in the rubber of the sealing device 10 in circumferentially spaced relation around the same.

The modified form of pressure-sealing insert 50 shown in Figure 5, for substitution in the sealing device 10, is similar in all respects to the insert 20 except that the spaced grooves 51, defining the tangs 52, extend into the cylindrical band portion 53 of the insert, thereby providing relatively greater resiliency in the tangs and permitting the use of relatively heavier gauge metal in the insert.

Other modifications of the invention may be resorted to without deviating from the scope of the disclosed invention or the spirit of the appended claims.

What is claimed is:

1. A device for pressure-sealing reception between the opposed inner bead portions of a tire casing in a sectional cavity mold for vulcanization of the tire therein under heat and internal pressure, comprising an annulus of resilient plastic material and of channel-shaped cross-section, providing laterally opposed flexible annular flange portions extending radially outwardly, the normal lateral spacing between the opposed flange portions being greater than the spacing between said tire bead portions in said mold, and the shape of the flange portions corresponding substantially to that of said inner bead portions, whereby said flange portions will yieldingly engage and conform to said inner bead portions, and annular insert means embedded in and axially coextensive with said annulus, said insert means including axially spaced rows of circumferentially spaced springy tangs extending freely within said flange portions of the annulus to be yieldingly flexible therewith, said insert means including the oppositely disposed said tangs thereon being generally channel-shaped in lateral cross-section.

2. A device for pressure-sealing reception between the opposed inner bead portions of a tire casing in a sectional cavity mold for vulcanization of the tire therein under heat and internal pressure, comprising an annulus of resilient plastic material and of channel-shaped cross-section, providing laterally opposed annular flange portions extending radially outwardly, the normal lateral spacing between the opposed flange portions being greater than the spacing between said tire bead portions in said mold, and the shape of the flange portions corresponding substantially to that of said inner bead portions, whereby said flange portions will yieldingly engage and conform to said inner bead portions, and insert means embedded in and axially coextensive with said annulus and extending circumferentially around the same, said insert means having axially spaced rows of circumferentially spaced springy tangs extending freely within said flange portions, said insert means being segmental with the segments thereof circumferentially spaced around said annulus, each said segment including oppositely disposed said tangs thereon being generally channel-shaped in lateral cross-section.

3. A device for pressure-sealing reception between the opposed inner bead portions of a tire casing in a sectional cavity mold for vulcanization of the tire therein under heat and internal pressure, comprising an annulus of resilient plastic material and of channel-shaped cross-section, providing laterally opposed upstanding annular flange portions, the normal lateral spacing between the opposed flange portions being greater than the spacing between said tire bead portions in said mold, and the shape of the flange portions corresponding substantially to that of said inner bead portions, whereby said flange portions will yieldingly engage and conform to said inner bead portions, and annular insert means of spring material embedded in said annulus, said insert means being generally channel-shaped in lateral cross-section providing opposed annular flange portions within said flange portion of said annulus, said flange portions of the insert means being notched to define circumferentially spaced springy tangs.

4. A device for pressure-sealing reception between the opposed inner bead portions of a tire casing in a sectional cavity mold for vulcanization of the tire therein under heat and internal pressure, comprising an annulus of resilient plastic material and of channel-shaped cross-section, providing laterally opposed upstanding annular flange portions, the normal lateral spacing between the opposed flange portions being greater than the spacing between said tire bead portions in said mold, and the shape of the flange portions corresponding substantially to that of said inner bead portions, whereby said flange portions will yieldingly engage and conform to said inner bead portions, and annular insert means of springy material embedded in said annulus, said insert means being channel-shaped in lateral cross-section, defining a continuous inner band and annular flange portions at opposite sides thereof within said flange portions of said annulus, said flange portions of the insert means being notched to define freely extending tangs, and said notches being extended into said band.

5. A device for pressure-sealing reception between the opposed inner bead portions of a tire casing in a sectional cavity mold for vulcanization of the tire therein under heat and internal pressure, comprising an annulus of resilient material and of channel-shaped cross-section, providing laterally opposed upstanding annular flange portions, the normal spacing between the opposed flange portions being greater than the spacing between said tire bead portions in said mold, and the shape of the flange portions corresponding substantially to that of said inner bead portions, whereby said flange portions will yieldingly engage and conform to said inner bead portions, said annulus being of resilient rubber material and annular insert means embedded in and axially coextensive with said annulus said insert means having axially spaced rows of circumferentially spaced springy tangs extending freely within said flange portions to be yieldingly flexible therewith, said insert means including the oppositely disposed said tangs thereon being generally channel-shaped in lateral cross-section, said annular insert means being of resilient, thin metal.

NORMAN H. TRITT.

REFERENCES CITED

The following references are of record in the file of this patent:

UNITED STATES PATENTS

| Number | Name | Date |
| --- | --- | --- |
| 1,665,440 | Brubaker | Apr. 10, 1928 |
| 1,681,973 | Brundage | Aug. 28, 1928 |
| 1,942,797 | Bittaker | Jan. 9, 1934 |
| 1,952,424 | Day | Mar. 27, 1934 |
| 1,982,674 | Laursen | Dec. 4, 1934 |